May 11, 1965 A. SAYAG 3,183,022
EXPANSION JOINTS
Filed June 8, 1961

INVENTOR.
ANDRE SAYAG
BY
ATTORNEY.

United States Patent Office 3,183,022
Patented May 11, 1965

3,183,022
EXPANSION JOINTS
Andre Sayag, St. Mande, France, assignor, by mesne assignments, to Zallea Brothers, Inc., Wilmington, Del., a corporation of Delaware
Filed June 8, 1961, Ser. No. 115,796
Claims priority, application France, June 15, 1960, 830,076
2 Claims. (Cl. 285—93)

Expansion joints are used in combination with piping or other apparatus for the circulation of fluids, some of which may be toxic or otherwise dangerous. It is, therefore, very important to be able to detect the possibility of a joint failure before it occurs, the expansion joints being more susceptible to failure and deterioration because the walls of the joints are necessarily thinner than the piping with which they are connected to allow for joint flexing and consequently failure of the joints would allow the fluids in the piping system to escape into the atmosphere. Accordingly, it is a principal object of this invention to provide expansion joint apparatus for detecting a joint failure before it occurs to thereby prevent accidents resulting from such a failure.

Another object of this invention is to provide a novel improved expansion joint structure wherein the walls or casing of the joint is corrugated in the manner of a bellows and is made of two plies of material in substantially continuous surface contact and sealed together at opposite ends so that the space between the plies is sealed off and to provide means for coupling a device responsive to the fluid circulating through the joint to the sealed off space between the plies so that failure of the inner ply of the expansion joint wall results in the piped fluid entering the sealed off space and being detected by the device coupled thereto.

The foregoing and other objects of the invention will be readily understood from a reading of the following description in conjunction with an examination of the appended drawings, wherein.

Figure 1:
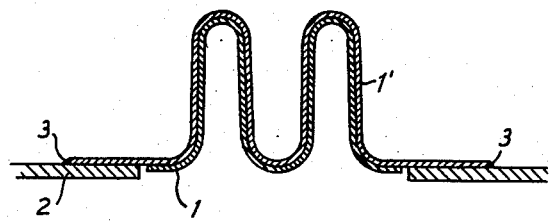
FIGURE 1 is a longitudinal sectional view through a conventional expansion joint having a wall formed of two plies of material.

In FIGURE 1 it is observed that the two ply joint illustrated includes an inner ply 1 and an outer ply 1', the joint, i.e., the corrugated bellows element, being secured to the piping 2 by means of the welds 3. It is apparent that this structure provides no possible means for detecting a failure in the joint before such occurs.

Figure 2:
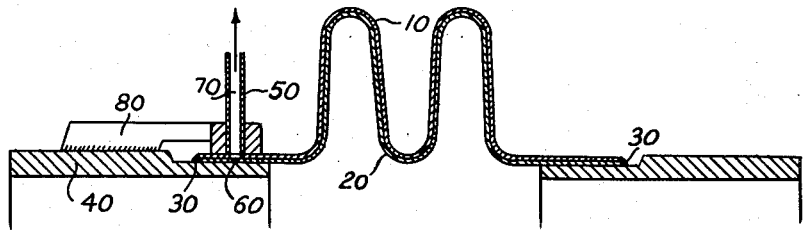
FIGURE 2 is a longitudinal sectional view through an expansion joint made according to the invention.

Turning now to FIGURE 2 which shows the improved expansion joint according to the invention, it is observed that the wall of the expansion joint is of two ply construction having an outer ply 10 and an inner ply 20 which are peripherally sealed together at opposite ends and to the joint end fittings 40 by means of the weld 30, the weld 30 at opposite ends of the expansion joint sealing off the space between the outer and inner plies 10 and 20 respectively. The outer ply 10 is apertured as at 60 and a coupling 50 is sealed to the outer ply 10 with the central opening 70 through the coupling in registery with the ply aperture 60 so that a sensing device attached to the coupling 50 may be placed in communication with the sealed space between the plies of the expansion joint. The two plies 10 and 20 forming the expansion joint wall are so designed that failure of the expansion joint always occurs by failure of the inner ply first. The coupling 50 would generally be secured to the outer ply 10 by means of a weld seal and since the ply material is of relatively light gauge metal an anti-torsion device, as for example 80, is fixedly secured to one of the joint end fittings 40 and keyed or otherwise locked to the coupling 50 to prevent rotation of the latter when a detecting device is secured thereto, the torsional force being absorbed by the anti-torsion device 80 and preventing rupture of the weld securing the coupling 50 to the outer ply 10.

Thus, it can be seen that any break or tear occurring in the inner ply 20 becomes immediately known because the piped fluid passing through the expansion joint penetrates into the space between the plies 10 and 20 and makes its way to the detecting device through the aperture 60 in the outer ply 10 and the central opening 70 through the coupling 50. The detecting device will, of course, register the joint failure and warn the supervisory personnel in some suitable manner, as for example by actuation of an alarm.

Figure 3:
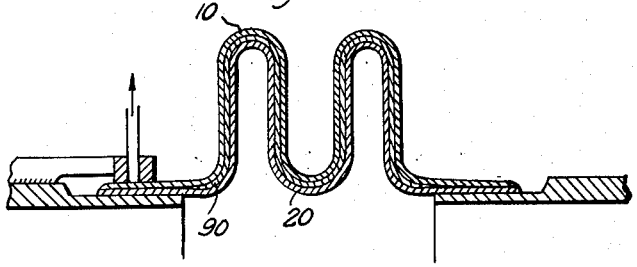
FIGURE 3 is a longitudinal sectional view through a modified form of the expansion joint made according to the invention.

If desired, as shown in FIGURE 3, a thin foil layer 90 may be inserted or placed between the plies 10 and 20 to act as a cushion between the plies and improve the resistance of the outer ply to breaks caused by mechanical action, the foil being unsecured at the opposite ends to provide better freedom of motion. Such a foil when employed, might typically be made of aluminum or stainless steel.

Having now described my invention in connection with a particularly illustrated embodiment thereof, it will be apparent that modifications and variations thereof may now occur to those persons normally skilled in the art without departing from the essential spirit or scope of my invention, and accordingly, it is intended to claim the same broadly as well as specifically as indicated by the appended claims.

What is claimed as new and useful is:

1. In an expansion joint for connection into a piping system for transmitting therethrough toxic and other fluents dangerous upon release to atmosphere, in combination, a pair of spaced apart rigid end fittings, a laminated construction of bellows element of generally cylindrical form having inner and outer plies of thin guage sheet material complementally shaped and internested to provide said element with a central corrugated section terminating at its opposite ends in axially alined cylindrical end extensions respectively connected to said end fittings to thereby form a continuous internal flow passage through the joint from one end to the other, which flow passage is isolated from the ambient atmosphere external of the joint when the same is connected into a piping system, said end fittings being each of a wall thickness at least as great as the sum of the thickness of said laminae and being respectively telescoped onto said cylindrical extensions the inner and outer plies of said central corrugated section of the bellows element being disposed with their contiguous surfaces in internested unsecured contact with one another throughout the full longitudinal and circumferential extent of said section, the terminal ends of the inner and outer plies of said cylindrical end extensions of said bellows element welded together to provide a peripheral seal between said laminae and reinforcing means for said end extensions and to define a marginally sealed fluid penetrable interfacial area between the plies extending from one peripheral seal to the other, said sealed interfacial area formed between the contacting surfaces of the plies being normally sealed off from the aforesaid internal flow passage through the joint and thus impervious to the entry into and flow through said area of any fluent except upon a break in or rupture of the inner ply of the laminated bellows element, aperture means formed in the outer ply of said laminae in a position over at least one of said telescoped end fittings, said aperture means including a member secured to said end fitting outwardly of and in overlying relation to said aperture and in reinforcing contact with said outer ply, conduit means in said aperture means coaxial with said aperture extending externally from the outer ply of one of said cylindrical extensions of the bellows element and communicating with said fluid penetrable interfacial area at a point located between the peripheral seal of said one cylindrical extension and the proximate end of said corrugated central section of the bellows element, and a sensing device coupled to said conduit for detecting the passage of the piped fluid through the inner ply of said corrugated section into said fluid penetrable interfacial area to thereby indicate the existence of such unsafe condition of the joint as would require its repair or replacement.

2. In an expansion joint for connection into a piping system for transmitting therethrough toxic and other fluents dangerous upon release to atmosphere, in combination, a pair of spaced apart rigid end fittings, a laminated construction of bellows element of generally cylindrical form having inner and outer plies of sheet material and an auxiliary intervening ply of thin foil all complementally shaped and internested to provide said element with a central corrugated section terminating at its opposite ends in axially alined cylindrical end extensions respectively connected to said end fittings to thereby form a continuous internal flow passage through the joint from one end to the other, which flow passage is isolated from the ambient atmosphere external of the joint when the same is connected into a piping system, the inner and outer plies of said central corrugated section of the bellows element being disposed with their facing surfaces respectively in internested unsecured contact with the intervening ply of foil throughout the full longitudinal and circumferential extent of said central corrugated section while the inner and outer plies of said cylindrical end extensions of said bellows element are peripherally sealed together at points spaced outwardly from the opposite ends of said intervening ply of foil to define marginally sealed fluid penetrable interfacial areas between the intervening foil ply and each of the inner and outer plies extending substantially from one peripheral seal to the other, said sealed interfacial areas formed between the contacting surfaces of the plies being normally sealed off from the aforesaid internal flow passage through the joint and thus impervious to the entry into and flow through said areas of any fluid except upon a break in or rupture of the inner ply of the laminated bellows element, conduit means extending externally from the outer ply of one of said cylindrical extensions of the bellows element and communicating with said fluid penetrable interfacial areas at a point located between the peripheral seal of said one cylindrical extension and the proximate end of said corrugated central section of the bellows element, and a sensing device coupled to said conduit for detecting the passage of the piped fluid through the inner ply of said corrugated section into said fluid penetrable interfacial areas to thereby indicate the existence of such unsafe condition of the joint as would require its repair or replacement.

References Cited by the Examiner

UNITED STATES PATENTS

| | | | |
|---|---|---|---|
| 568,989 | 10/96 | Reimer | 285—93 |
| 2,014,355 | 9/35 | Hussman | 285—45 |
| 2,444,988 | 7/48 | Guarnaschelli | 285—226 |
| 2,532,448 | 12/50 | Hasselhorn | 92—45 |
| 2,565,184 | 8/51 | Parlasca | 285—149 |
| 2,767,740 | 10/56 | Fentress | 285—226 |
| 2,770,799 | 11/56 | Horn | 285—93 |
| 2,832,613 | 4/58 | Farrar | 285—226 |
| 3,029,094 | 4/62 | Parlasca et al. | 285—93 |
| 3,087,745 | 4/63 | Rumbell | 285—93 |

FOREIGN PATENTS 373,473   4/23   Germany.

CARL W. TOMLIN, *Primary Examiner.*

THOMAS F. CALLAGHAN, *Examiner.*